Nov. 8, 1966 B. P. CHAUSSE 3,284,647

SIGNAL PRODUCING CIRCUIT

Filed Aug. 24, 1961 2 Sheets-Sheet 1

INVENTOR.
BURNETTE P. CHAUSSE

BY J T Comfort

ATTORNEY

Nov. 8, 1966

B. P. CHAUSSE 3,284,647

SIGNAL PRODUCING CIRCUIT

Filed Aug. 24, 1961

2 Sheets-Sheet 2

INVENTOR.
BURNETTE P. CHAUSSE
BY J T Comfort
ATTORNEY

United States Patent Office 3,284,647

Patented Nov. 8, 1966

3,284,647

SIGNAL PRODUCING CIRCUIT

Burnette P. Chausse, Roanoke, Va., assignor to General Electric Company, a corporation of New York Filed Aug. 24, 1961, Ser. No. 133,660
1 Claim. (Cl. 307—106)

Figure 1:
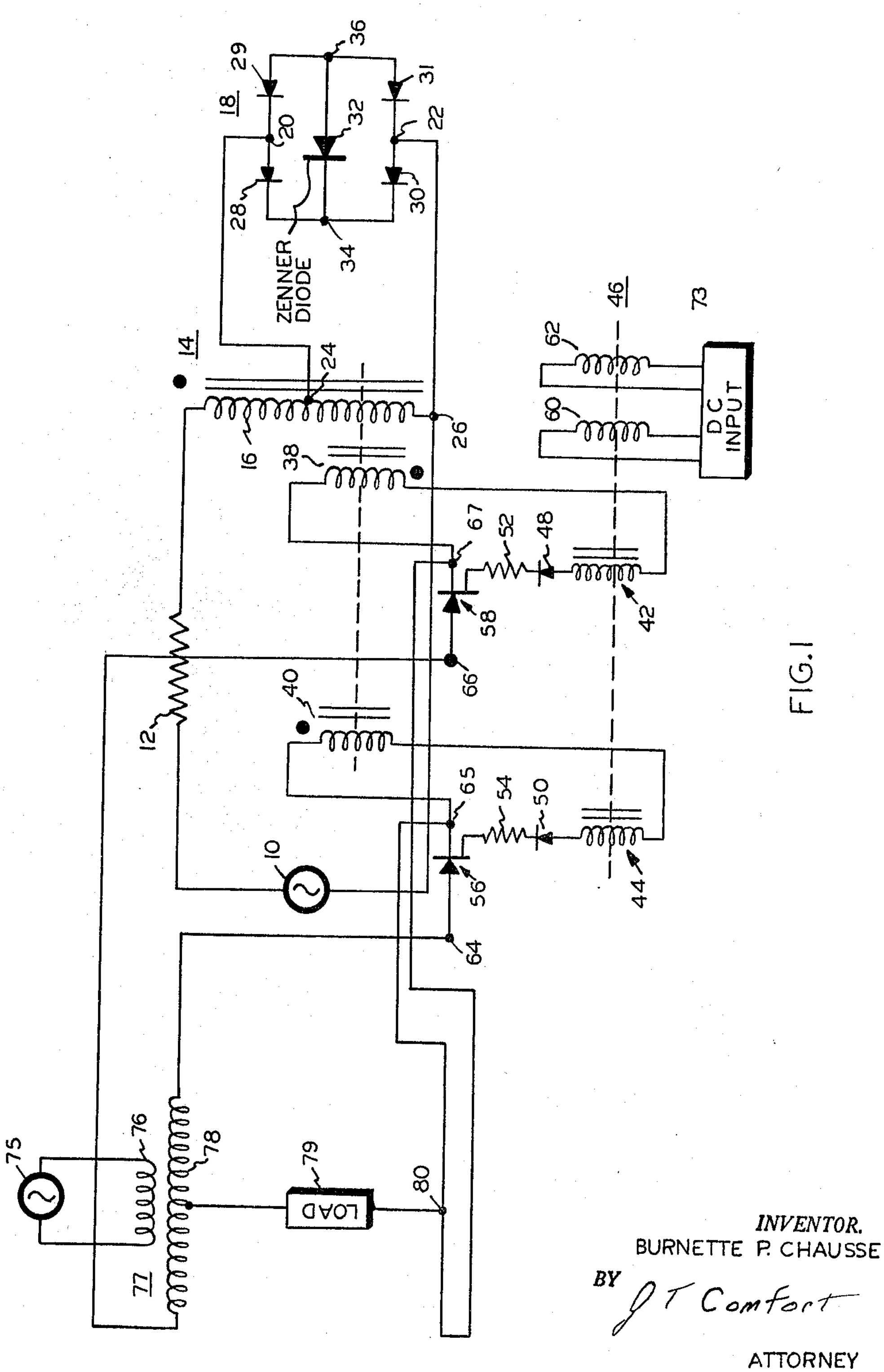

This invention relates to a square wave generating circuit and more particularly to a circuit for producing one of more controllable signals for firing a silicon controlled rectifier.

An object of this invention, therefore, is to provide a new and improved square wave generator.

Silicon controlled rectifiers are gated on or fired by positive signals applied to the gate electrode thereof, and it is desirable to control these signals linearly over the range of control.

Another object, therefore, of this invention is to provide a new and improved circuit to provide a controllable signal which is controlled linearly over the range of control.

It is desirable to isolate the power circuitry from the output and the input control and an object of this invention is to provide complete isolation of the power supply, the input control, and the output.

As the input voltage may vary, it is desirable that the output and control be insensitive to change in the input voltage and it is an object of this invention to so provide circuitry with an output and control insensitive to changes in the input voltage.

Another object of this invention is to provide fixed firing pulses at the end of the half cycle which are delivered to the power circuit for inversion.

Accordingly, a bridge network including four arms is connected to an alternating current supply. A unidirectional device is connected in each of the arms and a Zener diode is connected in the bridge network to clip the voltage of the alternating current applied to the bridge network so that a substantially square wave is produced by the bridge network.

Further, the square wave is applied to the primary of a transformer having one or more secondaries. A diode and a saturable reactor having one or more control windings are connected in series with the secondary and compose a self-saturating saturable reactor, the rest of the half of the square wave is passed and applied to the gate electrode of a suitably biased silicon controlled rectifier to fire the silicon controlled rectifier. The time necessary to saturate the self-saturating saturable reactor and pass a signal may be linearly controlled by the control input to the control windings of the saturable reactor.

The bridge network provides a square wave. The signal derived therefrom is linearly controllable and with the provision of a first secondary winding directly coupled and a second secondary winding reversibly coupled, more than one signal at different times is provided to fire different silicon controlled rectifiers. The power supply, the input control and the output control are all isolated. With the Zener diode, voltage variations in the power supply do not affect the output signal. A fixed firing pulse for inversion may be delivered at the end of each half cycle.

The novel features of the invention are set forth with particularity in the appended claims. The invention itself, however, both as to its organization and method of operation, together with further objects and advantages thereof, may best be understood by referring to the following description and the accompanying drawings.

In the figures.

FIG. 1 is a schematic of a circuit constructed in accordance with the principles of this invention.

Figure 2:
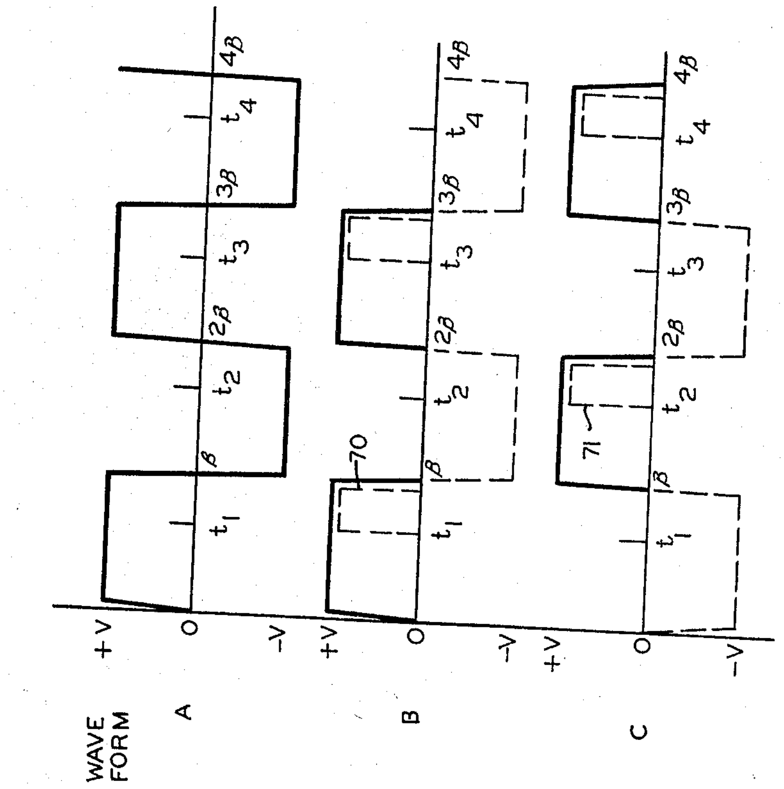

FIG. 2 shows the waveforms applied to the primary winding 16 of transformer 14 and transferred to the secondary windings 38 and 40.

Referring now to FIG. 1 a current generator 10 generates a suitable sinusoidal alternating current such as 230 volts, 60 cycles. A current limiting resistor 12 is connected in series with the current generator 10 and one terminal of the primary winding 16 of a transformer 14. The other terminal of the primary 16 is connected to the current generator 10.

The primary winding 16 is provided with a plurality of taps for easy voltage adjustment. Terminal 20 and terminal 22 of a bridge type network 18 are connected to taps 24 and 26, respectively, of primary winding 16. The bridge type network 18 comprises diodes 28–31 and Zener diode 32. Diodes 28–31 form the arms of the bridge type network with the anode of Zener diode 32 connected to terminal 36 and the cathode of Zener diode 32 connected to terminal 34. The Zener diode 32 has the well known reverse breakdown characteristic which permits conduction in the back direction from the cathode to the anode when voltages exceeding certain values are applied. The forward impedance is very low; but the reverse impedance is such that no current flows through the Zener diode from the cathode to the anode until the voltage exceeds breakdown voltage, which in the particular instance is approximately 10 volts.

The primary winding 16 of transformer 14 is coupled to two secondary windings 38 and 40 with secondary winding 38 reversibly wound. Each secondary winding is connected in a circuit comprising a core 42 and 44 of a saturable reactor 46, a diode 48 and 50, a circuit limiting resistor 52 and 54 and the gate and cathode of a silicon controlled rectifier 56 and 58. Saturable reactor 46 is provided with control windings 60 and 62. The diodes 48 and 50 permit self saturation of the cores 42 and 44 in a self-saturating saturable reactor circuit. The cathodes and anodes of silicon controlled rectifiers 56 and 58 are connected to the terminals 64–67 of a center tapped power circuit as shown. The power circuit has a current generator 75 generating 230 volts, 60 cycles current. The alternating current is applied to the primary winding 76 of a transformer 77 and transferred to a center tapped secondary winding 78. The load 79 is connected to the center tap and to a point 80. Any other standard power circuit such as a three phase bridge circuit may be connected to the silicon controlled rectifiers 56 and 58 in a similar manner.

Reference should now be made to FIGS. 1 and 2 for a description of the operation. The alternating current generated by current generator 10 flows through resistor 12 and the primary winding 16 of transformer 14. During the positive half cycle of the alternating current, input current flows through diode 28, Zener diode 32 and diode 31 when the voltage of the input waveform exceeds the breakdown voltage of the Zener diode 32, which is approximately 10 volts. During the negative half cycle of the input waveform, current flows through diode 30, Zener diode 32 and diode 29, when the voltage of the input waveform exceeds the breakdown voltage of the Zener diode 32 which is approximately 10 volts. For an input waveform of 230 volts the output waveform from the bridge type circuit 18 is almost a square wave such as waveform A in FIG. 2 with the amplitude being approximately 10 volts. The Zener diode 32 clips the input waveform at 10 volts in both the positive half cycle and the negative half cycle to produce the square wave.

The square waveform shown as waveform A in FIG. 2 is impressed upon the primary winding 16 and transferred directly to secondary winding 40 as waveform B in FIG. 2 and inversely to secondary winding 38 as waveform C in FIG. 2. The taps on primary 16 provide for easy voltage adjustment to permit the use of a low voltage Zener with better temperature regulation. The ratio of the windings of the secondaries to the primary depend on the amplitude of the waveforms to be applied to the silicon controlled rectifiers. Silicon controlled rectifiers 56 and 58 when forward biased begin conduction when a positive signal is applied to the gate electrode.

The positive half of waveform B transferred to secondary 40 is impressed upon the self-saturating saturable reactor composed of core 44 and diode 50. Because of the high impedance of the core 44, current does not flow. The core 44 absorbs a number of volt seconds depending upon the net resultant of ampere-turns of the control winding. Self-saturating saturable reactors are well known and will not be explained further. At time $T_1$ the core 44 saturates, its impedance drops to a low value, and the remainder of the positive half wave of voltage represented by the dashed waveform 70 in FIG. 2 is applied to the gate electrode of the silicon controlled rectifier 56 to fire the silicon controlled rectifier. Current then flows through the silicon controlled rectifier 56 in the power circuit. The operation of a power circuit as shown is well known and will not be described. As time progresses beyond time $\beta$, the core may be reset by the control windings to a high impedance. The silicon controlled rectifier 56 conducts until commutated by a positive signal on the cathode of the silicon controlled rectifier 56. The operation as described is repeated with the transfer of another positive half of the waveform B to the secondary winding 40.

Waveform A is transferred to the secondary winding 38 and inverted, resulting in waveform C in FIG. 2. The negative portion of waveform A inverted to the positive portion of waveform C is impressed upon the self-saturating saturable reactor composed of core 42 and diode 48 to saturate the core 42 and fire silicon controlled rectifier 58 with a signal 71 in FIG. 2, starting at time $T_2$. The rest of the operation is identical to that described above with respect to secondary winding 40 and the associated circuitry.

A firing pulse at the end of each half cycle may be produced by delivering a larger voltage to the cores 44 and 42 than they are designed for so that they saturate and provide a pulse for inversion in the power circuits. Such a high voltage may be delivered by selecting the proper taps on the primary winding 16 of transformer 14.

The time of firing the silicon controlled rectifiers can easily be varying the net ampere-turns in the control windings 60 and 62 by varying the D.C. input from D.C. power source 73.

By varying the net ampere-turns in the control windings, the time from 0 to T, and $T_1$ to $\beta$ of waveform $\beta$ in FIG. 2 and the time from $\beta$ to $T_2$ and $T_2$ to $2\beta$ can be varied. As the silicon controlled rectifiers are fired at time $T_1$, $T_2$, etc., it can thus be seen that the firing time can easily be varied linearly.

A novel and inventive circuit has ben described. A novel circuit for generating a square wave has been described. Further, a novel and inventive circuit including the square wave generator has been described for producing a controllable signal for firing a silicon controlled rectifier. The power supply, the input control, and the output signal are isolated. The output signal is controllable linearly over the range of control. More than one output signal may be produced at predetermined time intervals for firing more than one silicon controlled rectifier at different times. A firing pulse for inversion may be delivered to the power circuit at the end of the half cycle.

While this invention has been explained and described with the aid of a particular embodiment thereof, it will be understood that the invention is not limited thereby and that many modifications will occur to those skilled in the art. It is therefore contemplated by the appended claim to cover all such modifications as fall within the scope and spirit of the invention.

What is claimed is:

A circuit for producing more than one controllable signal comprising square wave generating means, transformer means having at least two secondary windings, a first secondary winding directly coupled to said primary winding and a second secondary winding inversely coupled to said primary winding, means connecting said square wave generating means to said primary winding of said transformer, a first signal circuit comprising a first electrical circuit connection to one end of said first secondary winding and a second electrical circuit connection to the other end of said first secondary winding, said second electrical circuit connection comprising a first self-saturating saturable reactor in series circuit with a first diode and a first resistor, a second signal circuit comprising a third electrical circuit connection to one end of said second secondary winding and a fourth electrical circuit connection to the other end of said second secondary winding, said second electrical circuit connection comprising a second self-saturating saturable reactor in series circuit with a second diode and a second resistor, and control windings coupled to said saturable reactors, said control windings being adapted to control the time at which said self-saturating saturable reactors are saturated upon application of a control signal to said respective control windings.

References Cited by the Examiner

UNITED STATES PATENTS

| | | | |
|---|---|---|---|
| 2,809,303 | 10/1957 | Collins | 307—106 |
| 2,953,693 | 9/1960 | Phillips | 307—88.5 |
| 2,976,429 | 3/1961 | Abbott | 307—88 |
| 2,988,654 | 6/1961 | Katzenstein | 307—106 |
| 3,002,113 | 9/1961 | Winn | 307—106 |
| 3,054,043 | 9/1962 | Werner | 307—88.5 |

MILTON O. HIRSHFIELD, *Primary Examiner.*

S. A. ROEN, J. J. SWARTZ, *Assistant Examiners.*